United States Patent [19]

Wu

[11] Patent Number: 4,781,790
[45] Date of Patent: Nov. 1, 1988

[54] METHOD OF MAKING MEMORY DEVICES

[76] Inventor: Jiun-Tsong Wu, 446 Manzanita Ave., Sierra Madre, Calif. 91024

[21] Appl. No.: 64,758

[22] Filed: Jun. 22, 1987

Related U.S. Application Data

[62] Division of Ser. No. 750,733, Jul. 1, 1985, abandoned.

[51] Int. Cl.$^4$ ............................................. G11C 13/00
[52] U.S. Cl. .................................. 156/633; 156/645; 156/651
[58] Field of Search ............... 156/633, 643, 644, 645, 156/651, 652, 655, 659.1, 661.1, 619, 293, 257, 219, 69; 365/127; 427/259; 264/139; 219/121 LM

[56] References Cited

U.S. PATENT DOCUMENTS

| | | | |
|---|---|---|---|
| 3,923,566 | 12/1975 | Law | 156/645 |
| 3,980,461 | 9/1976 | Moeckel | 65/3.12 |
| 4,081,314 | 3/1978 | Smith | 156/645 |
| 4,126,854 | 11/1978 | Sheridon | 340/373 |
| 4,247,361 | 1/1981 | Shaheen | 156/633 |
| 4,256,533 | 3/1981 | Mayer | 156/659.1 |
| 4,323,420 | 4/1982 | Masnari | 156/633 |
| 4,532,608 | 7/1985 | Wu | 365/127 |

FOREIGN PATENT DOCUMENTS 1439080  6/1976  United Kingdom ................ 156/633

OTHER PUBLICATIONS

Nickols et al.; IBM Technical Disclosure Bull., vol. 20, No. 8, 1-1978, pp. 3307-3308.
Marks et al.; IBM Technical Disclosure Bull., vol. 25, No. 11A, 4-1983, pp. 5523-5524.
Patents Abstracts of Japan, vol. 5, No. 165 (P-85) [837], 22nd Oct. 1981; & JP-A-59 94 529 (Fujitsu K. K.) 31-0-7-1981.
Patents Abstracts of Japan, vol. 7, No. 287 (M-264) [1432], 21st Dec. 1983; & JP-A-58 162 387 (Canon K. K.) 27-09-1983.
Proceedings of the IEEE, vol. 61, No. 2, Feb. 1973, pp. 148-153, IEEE, New York, US; G. W. Taylor: "A liquid-vapor display".
Transistor Technology, vol. III; edited by F. J. Biondi; D. Van Nostrand Company, Inc., Princeton, N.J.; 1958; pp. 160-161.
Handbook of Thin Film Technology; edited by L. I. Maissel et al.; McGraw Hill Book Company, N.Y.; 1970; pp. 7-48 and 7-49.

*Primary Examiner*—Kenneth M. Schor
*Attorney, Agent, or Firm*—Edward J. DaRin

[57] ABSTRACT

A method for making an optical memory storage medium which has a transparent substrate with void cells of empty spaces and ablative material on the cell walls is disclosed. In one example, a base plate is coated with a masking layer. Pits are formed on the plate by mechanically stamping the masking layer and the base plate with a punch. A layer of ablative material is next applied on the pitted plate. The masking layer is then removed, together with any ablative material on it. The base plate is joined with a cover plate that seals the top of the pits to form void cells. In another example, a base plate is coated with a photo resist. The photo resist is exposed and developed. Pits are formed on the plate by etching the uncovered areas of the base plate. This is followed by the application of ablative material and the removal of the photo resist. The base plate is joined with a cover plate that seals the top of the pits to form void cells.

2 Claims, 3 Drawing Sheets

METHOD OF MAKING MEMORY DEVICES

CROSS REFERENCE TO RELATED APPLICATIONS

This is a division of application Ser. No. 750,733, filed 7/01/85 and now abandoned.

BACKGROUND OF THE INVENTION

This invention relates to an optical memory device disclosed in a separate U.S. patent application by the applicant, titled MEMORY DEVICE, Ser. No. 06/392,147, filed June 25, 1982, now U.S. Pat. No. 4,532,608.

The memory device comprises a substrate having a plurality of void cells with empty spaces. Each void contains a certain amount of ablative material deposited on its wall. The substrate is transparent to the light used for reading and writing of the information. The cells, or bubbles, with empty spaces of certain shape, are embedded in the substrate. The ablative material is opaque to the light used for reading and writing of the information. The ablative material can be vaporized by a high intensity light beam during a write operation.

The distribution of the ablative material on the cell wall determines the content of the information stored. During a read operation, a low intensity light beam is directed towards the cell to detect the pattern of distribution of the ablative material. During a write operation, a high intensity light beam is directed towards the cell to vaporize and redistribute the ablative material.

Figure 1:
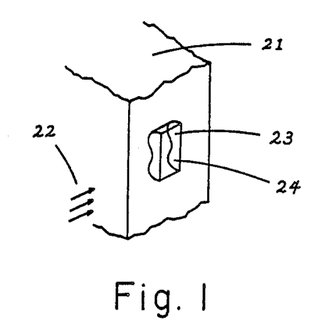
FIG. 1 shows one embodiment of the memory device for storage of binary information.

In one embodiment of the memory device, a cell is used to store one bit of information. The cell is made in an elongated shape with its middle slightly constricted. When a bit of information is stored, one end of the cell has the ablative material covering its wall and the other end is clear of the ablative material. A binary one or zero is stored depending on which end is covered or clear. To read the information, a low intensity light beam is directed towards one particular end of the cell. A light sensor downstream of the light beam is used to detect the content of the information. To change the content of the information previously stored, a high intensity light beam is directed towards the end covered with ablative material. The light beam is of sufficient intensity so that the ablative material is vaporized. The vaporized material diffuses to the other end and is then allowed to cool down and deposit on its wall. As a result, a binary zero is changed to a one or vice versa. FIG. 1 illustrates such an embodiment. A substrate 21 is made as a plate. A cut on the plate exposes one half of a cell. The cell has two ends 23 and 24 joined by a narrower section. The two ends represent the numbers 0 and 1. If the end 23 is clear and the end 24 is covered, the number 0 is stored. If the end 24 is clear and the end 23 is covered, the number 1 is stored. A light beam 22 is shown directed towards the lower end of the cell. The plate in this figure is shown facing the left.

This invention discloses a method for making the memory device of the type disclosed.

An important property of a mass memory device is its ability to store a large amount of information in a given surface area of the recording medium. To achieve a high density of information in the memory device refered to above, small cell size is required. A suitable amount of ablative material should also be sealed in each cell. An object of this invention is to disclose a method for making the memory device with small cells and with controllable amounts of ablative material sealed in them. Another object is to make the memory device with cells of desirable shape and at preselected locations. Still another object of the invention is to disclose a method that is suitable for mass production of the memory device.

BRIEF SUMMARY OF THE INVENTION

The material chosen for the substrate may be glass or plastic. The ablative material may be metal, iodine, phosphorus, inorganic compound, or organic compound that is easily vaporized by a high intensity light beam. It is preferable to choose an ablative material with its vaporization temperature lower than the melting point of the substrate.

Several examples of the method are described in this specification. The examples involve some common steps which will be outlined as follows. More detail description of the method will be given later.

The main structure of the memory device is made by joining two plates together. Before the plates are joined, one of them have pits with ablative material deposited in them. The pits form the memory cells close to the boundary of the two plates when they are joined. The two plates will be called the base plate and the cover plate respectively. In a typical application, the memory device is made as a circular disk with a hole in the middle which can be engaged with a spindle.

Figure 2:
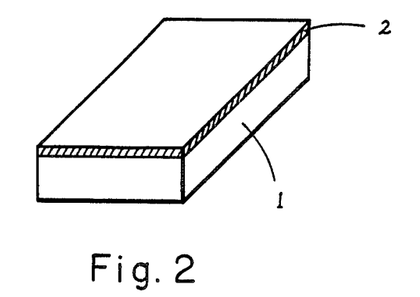
FIGS. 2 and 3 show a base plate coated with a masking layer.
Figure 3:
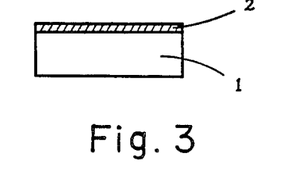
Figure 4:
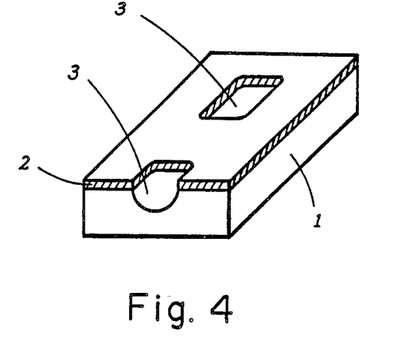
FIGS. 4 and 5 show the base plated with pits formed on it.
Figure 5:
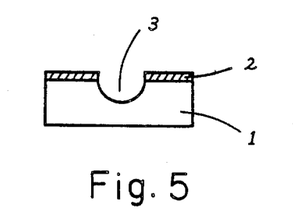

The method involves three basic steps. The first step prepares the base plate of the substrate. Initially, the base plate of the substrate has a flat surface. A masking layer is coated on top of it. FIGS. 2 and 3 show the base plate coated with the masking material. FIG. 2 is a perspective view of a portion of the coated base plate. FIG. 3 is a cross sectional view of the same portion of the coated base plate. Shown in the figures are the base plate 1 and the masking layer 2. The plate in FIGS. 2 and 3, as well as those in the rest of the drawings, are shown facing up. Pits at the desired locations for the memory cells are formed by removing or displacing parts of the masking material and the base plate. As will be disclosed in more details later, the pits can be formed in more than one ways, such as stamping and etching. FIGS. 4 and 5 show the base plate of the substrate with pits formed on it. FIG. 4 is a perspectiive view of a portion of the pitted base plate. FIG. 5 is a cross sectional view of the same portion of the base plate. Shown in FIG. 4 are the base plate 1, the masking layer 2, and the pits 3. The pit in the front is shown cut in half for illustration purpose. Shown in FIG. 5 are the base plate 1, the masking layer 2, and the pit 3.

Figure 6:
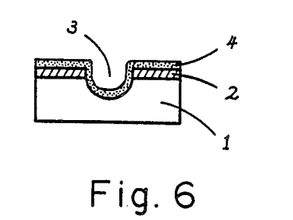
FIG. 6 shows the base plate with ablative material applied.
Figure 7:
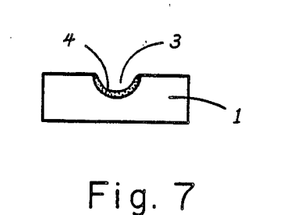
FIG. 7 shows the base plate with the masking layer removed.

The second step involves the application of the ablative material and the removal of the masking layer. The base plate prepared in the first step is coated with the ablative material. The coated base plate is shown in FIG. 6. The figure shows the cross sectional view with the base plate 1, the masking layer 2, the pit 3, and the ablative material 4. The masking layer is then removed, together with any ablative material that may have been coated on it. This leaves the base plate of the substrate with the pits and the ablative material in the pits. FIG. 7 shows the base plate 1, the pit 3, and the ablative material 4 at the end of this step. As will be disclosed in more details, variations are possible in the coating and the removal processes.

Figure 8:
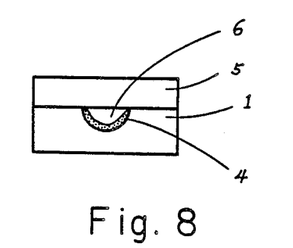
FIG. 8 shows the completed device with the base plate and the cover plate joined.

The third step involves joining or uniting the base plate of the substrate with the cover plate of the substrate. The top of the pit is thus sealed by the cover plate. The covered pit forms the empty cell with ablative material in it. This completes the construction of the memory device. FIG. 8 shows a cross section of a portion of the completed memory device. Shown in the figure are the base plate 1, the ablative material 4, the cover plate 5, and the empty cell 6. Details of the third step again vary and will be disclosed later.

DETAILED DESCRIPTION OF THE METHOD

Each step described above can be done in more than one ways. The followings are examples of making the memory device based on the three steps.

EXAMPLE 1

A plastic plate is prepared with a flat surface. The plate is coated with a thin layer of masking material. The masking material is preferable softer than the plastic plate. The masking material is solvable in a sovent to be used later in the second step. The coated base plate is shown in FIGS. 2 and 3.

Figure 9:
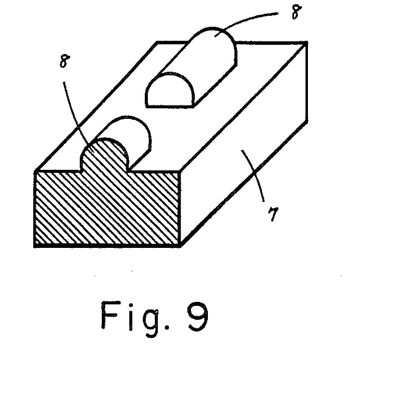
FIG. 9 shows a punch used to stamp a base plate.

A stamping punch is made of a hard metal with protrusions on it. The location and the shape of the protrusion correspond to the pit to be formed on the base plate. The punch is shown in FIG. 9 with body 7 and protrusion 8. The protrusion in the front is shown cut in half for illustration purpose. The punch is shown facing up.

Figure 10:
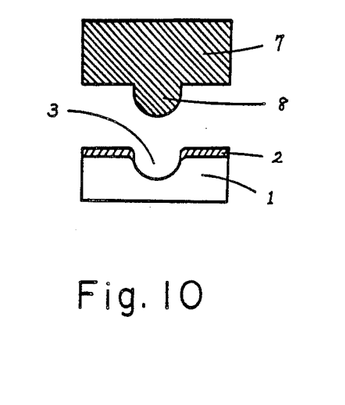
FIG. 10 shows the punch and the base plate stamped.

The punch is then pressed on the plastic plate. Sufficient pressure is applied so that the protrusion on the punch penetrates the masking layer and further displaces the plastic underneath. Thus pits are formed on the plastic plate when the punch is removed. The stamping action also exposes the plastic in the areas where the pits are formed. FIG. 10 is a cross sectional view which shows the relative positions of the punch and the base plate stamped. The upper part of the figure shows the punch facing down with the body 7 and the protrusion 8. The lower part of the figure shows the base plate 1, the masking layer 2, and the pit 3. The plastic plate with pits formed this way is shown in FIGS. 4 and 5 with the base plate 1, the masking layer 2, and the pit 3. This completes the first step.

The base plate prepared above is then coated with the ablative material. There are several ways to coat the ablative material. Vapor depositing in vacuum or sputtering may be used. Alternatively, the ablative material may be dissolved in a solvent and the solution coated on the base plate. The solution is then evaporated, leaving the ablative material on the plate. The ablative material may be deposited in the pits as well as on the masking layer. However, it is possible to confine the areas where the ablative material is deposited to the pits only. This is done by using proper combination of the material for the base plate, the material for the masking layer, and the solvent. If the material for the base plate has strong affinity for the solvent but the material for the masking layer repels the solvent, then it is possible to wet the pitted area only, leaving the masking layer free of the solution. This selective adhession of a solvent to predetermined area of a surface is used extensively in lithographic printing where the printing ink adheres to selected areas on the printing plate. The coated base plate is shown in FIG. 6 with the base plate 1, the masking layer 2, the pit 3, and the ablative material 4.

The masking layer is then washed away in a suitable solvent, which is sometimes called the stripping solution. The solvent is chosen to be the kind that dissolves the masking layer but not the ablative material. When the masking layer is washed away, any ablative material that has been coated on it is also removed. The masking layer can also be removed by dissolving it chemically. Either way, the base plate is left with pits and the ablative material in each pit. This completes the second step. FIG. 7 shows the base plate prepared this way with the base plate 1, the pit 3, and the ablative material 4.

Another plastic plate is prepared as the cover plate. The cover plate is joined with the first plastic plate. The two may be joined by fusion with heat or by adhessive. This completes the third step. FIG. 8 shows the completed memory device with the base plate 1, the cover plate 5, the ablative material 4, and the empty cell 6.

An alternative to the third step described above is possible. The base plate prepared by the first step is inverted and placed on a monomer in an uncured state. The monomer is then polymerized so that it solidifies to form the cover plate and is joined with the first plastic plate. A memory device with empty cells and ablative material is thus formed.

EXAMPLE 2

A plastic plate is prepared with a flat surface. The plate is coated with a thin layer of masking material. The masking material is preferable softer than the plastic plate. The masking material is solvable in a stripping solution to be used later in the second step. As in example 1, the coated base plate is shown in FIGS. 2 and 3.

Figure 11:
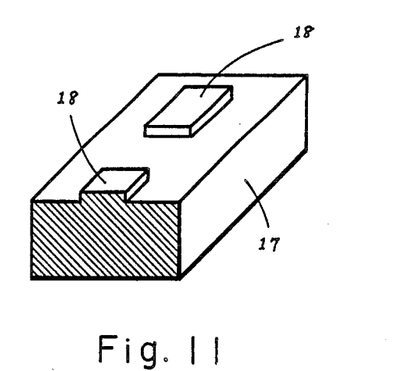
FIG. 11 shows another punch used to stamp a base plate.

A stamping punch is made of a hard metal with protrusions on it. The location and shape of the protrusion correspond to the pit to be formed on the plastic plate. The punch is shown in FIG. 11 with body 17 and protrusion 18. The protrusion in the front is shown cut in half for illustration purpose. The punch is shown facing up.

Figure 12:
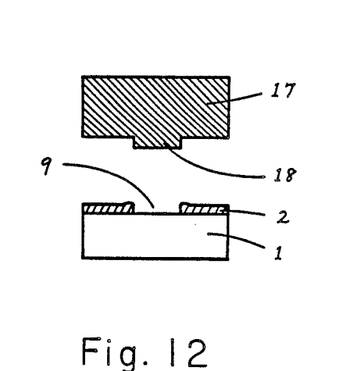
FIG. 12 shows the punch and the base plate stamped.
Figure 13:
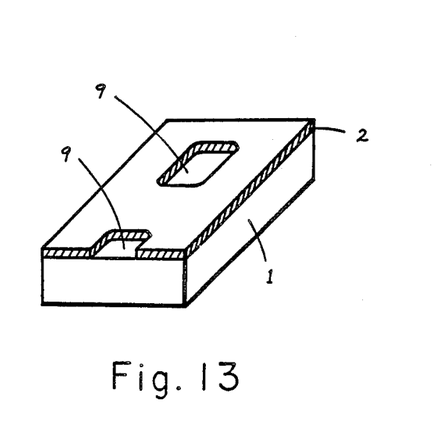
FIG. 13 shows the base plate with the masking layer.

The punch is then pressed on the plastic plate. The pressure applied is only high enough so that the protrusion on the punch penetrates the masking layer but not the plastic underneath. The stamping action exposes the plastic in the areas where the protrusion penetrates. But unlike example 1, no pit is formed below the masking layer by the stamping action. FIG. 12 is a cross sectional view which shows the relative positions of the punch and the base plate stamped. The upper part of the figure shows the punch facing down with the body 17 and the protrusion 18. The lower part of the figure shows the base plate 1, the masking layer 2, and the uncovered area 9. A perspective view of the base plate that has been stamped this way is shown in FIG. 13 with the base plate 1, the masking layer 2, and the uncovered area 9.

A solvent that does not dissolve the masking layer is then used to partially dissolve the uncovered surface of the plastic plate thus stamped. This forms pits in the exposed areas. The plastic plate with pits formed this way is shown in FIGS. 4 and 5. This completes the first step.

The base plate prepared in the first step is then coated with the ablative material. Again, there are several ways to coat the ablative material. These include vapor depositing in vacuum, sputtering, and evaporization of a solution of the ablative material. FIG. 6 shows the base plate with the ablative material applied. The masking material is then removed by dissolving it with a solvent or dissolving it chemically. The removal of the masking material leaves the plastic plate with pits that have ablative material in them. This completes the second step. FIG. 7 shows the base plate prepared this way.

Another plastic plate is prepared. The second plastic plate is joined with the first plastic plate. The two may be joined by fusion with heat or by adhessive. This completes the third step and thus the making of the memory device. The completed memory device is shown in FIG. 8.

EXAMPLE 3

A glass plate is prepared with a flat surface. The plate is coated with a thin layer of masking material, such as wax or resin or their mixture. The masking material is preferable softer than the glass plate. The masking material is solvable in a stripping solution to be used later in the second step. As in example 1, the coated base plate is shown in FIGS. 2 and 3.

A stamping punch is made of a hard metal with protrusions on it. The location and shape of the protrusion correspond to the pit to be formed on the base plate. The punch is shown in FIG. 11 with body 17 and protrusion 18. The protrusion in the front is shown cut in half for illustration purpose. The punch is shown facing up.

The punch is then pressed on the glass plate. The pressure applied is only high enough so that the protrusion on the punch penetrates the masking layer but not the glass underneath. The stamping action exposes the glass in the areas where the protrusion penetrates. But no pit is formed below the masking layer by the stamping action. FIG. 12 is a cross sectional view which shows the relative positions of the punch and the base plate stamped. The upper part of the figure shows the punch facing down with the body 17 and the protrusion 18. The lower part of the figure shows the base plate 1, the masking layer 2, and the uncovered area 9. A perspective view of the base plate that has been stamped this way is shown in FIG. 13 with the base plate 1, the masking layer 2, and the uncovered area 9.

The glass plate thus prepared are then etched. Etching can be done with hydrofluoric acid either as a vapor or as a solution in water, but also with an amonium fluoride or amonium bifluoride solution or any of the many known mixtures with other soluble salts in solution. The masking layer protects the covered area of the glass and only the uncovered areas of the glass area are etched. Each etched area of the glass forms a pit. The base plate with pits formed this way is shown in FIGS. 4 and 5. This completes the first step.

The base plate prepared in the first step is then coated with the ablative material. Again, there are several ways to coat the ablative material. These include vapor depositing in vacuum, sputtering, and evaporization of a solution of the ablative material. FIG. 6 shows the base plate with the ablative material applied. The masking material is then removed by dissolving it with a solvent or dissolving it chemically. The removal of the masking material leaves the glass plate with pits that have ablative material in them. This completes the second step. FIG. 7 shows the base plate prepared this way.

Another glass plate is prepared. The second glass plate is joined with the base plate. The two may be joined by fusion with heat or by adhesive.

Various methods are known in the arts for uniting two pieces of glass. The two plates may be fused together with heat. Alternatively, the second piece of glass can be joined with the first piece of glass with an adhesive or cement which is cured with or without heat. Sodium silicate, also known as water glass, is an example of such adhesive. Mixture of sodium silicate with other salt, such aluminum fluoride has also been used. Mixture of lead oxide and glycerine is another example. A third possibility is to coat the cover plate with a binding agent and apply heat to it while the two plates are held together. An example of the binding agent, known as a glass solder, is described in U.S. Pat. No. 2,615,816 by A. P. Devey, M. Manners, and J. H. Partridge. U.S. Pat. No. 3,880,632 by G. Y. Podvigalkina describes various methods of joining two pieces of glass with heat, in particular, one which uses silica as binding agent and infarad radiation to heat the binding agent.

The joining of the two pieces of glass completes the third step and thus the making of the memory device. The completed memory device is shown in FIG. 8.

EXAMPLE 4

A flat glass plate is coated with a layer of photo resist as the masking layer. FIGS. 2 and 3 show the base plate coated with the photo resist. Shown in the figures are the base plate 1 and the masking layer 2 (i.e. the photo resist). The coated plate is exposed to light through a photomask with suitable pattern on it. The exposed photo resist is then developed so that certain areas of the coated layer are removed. Depending on whether the photo resist used is the positive type or the negative type, the area removed may be the part exposed to the light or the part not exposed. The area with the photo resist removed is the location where the memory cell will be located in the final product. The composition of the photo resist and the method to coat and expose it are well known in the arts of making semiconductor integrated circuit and making printed circuit board. The making of printing plate also uses a similar technique. A perspective view of the base plate prepared this way is shown in FIG. 13 with the base plate 1, the masking layer 2, and the uncovered layer 9.

The glass plate thus prepared are then etched to form pits in the uncovered area. The base plate with pits formed this way is shown in FIGS. 4 and 5. This completes the first step.

The base plate prepared in the first ste is then coated with the ablative material. Again, there are several ways to coat the ablative material. These include vapor depositing in vacuum, sputtering, and evaporization of a solution of the ablative material. FIG. 6 shows the base plate with the ablative material applied. The photo resist is then removed by dissolving it with a solvent or dissolving it chemically. The removal of the photo resist leaves the base plate with pits that have ablative material in them. This completes the second step. FIG. 7 shows the base plate prepared this way.

A second glass plate is then prepared with a flat surface to cover the first glass plate. The two pieces of glass are joined together to form the memory device. This completes the third step and thus the making of the memory device. The completed memory device is shown in FIG. 8.

EXAMPLE 5

A flat plastic plate is coated with a photo resist as the masking layer. FIGS. 2 and 3 show the base plate coated with the photo resist. Shown in the figures are the base plate 1 and the masking layer 2 (i.e. the photo resist). The coated plate is exposed to light through a photomask with suitable pattern on it. The exposed photo resist is then developed so that certain areas of the coated layer are removed. The area with the photo resist removed is the location where the memory cell will be located in the final product. A perspective view of the base plate prepared this way is shown in FIG. 13 with the base plate 1, the masking layer 2, and the uncovered area 9.

A solvent that does not dissolve the photo resist is then used to partially dissolve the uncovered surface of the plastic plate thus prepared. This forms pits in the uncovered area. The plastic plate with pits formed this way is shown in FIGS. 4 and 5. This completes the first step.

The base plate prepared in the first step is then coated with the ablative material. Again, there are several ways to coat the ablative material. These include vapor depositing in vacuum, sputtering, and evaporization of a solution of the ablative material. FIG. 6 shows the base plate with the ablative material applied. The photo resist is then removed by dissolving it with a solvent or dissolving it chemically. The removal of the photo resist leaves the plastic plate with pits that have ablative material in them. This completes the second step. FIG. 7 shows the base plate prepared this way.

Another plastic plate is prepared. The second plastic plate is joined with the first plastic plate. The two may be joined by fusion with heat or by adhesive. This completes the third step and thus the making of the memory device. The completed memory device is shown in FIG. 8.

EXAMPLE 6

A plastic plate is prepared with a flat surface. The plate is coated with a thin layer of masking material. The masking material is soluble in a stripping solution to be used later in the second step. The coated plastic plate is shown in FIGS. 2 and 3.

A high power light source, preferably a laser, is focused on the surface of the plate to ablate the masking layer and the plastic below. The beam is focused, one after another, at the locations where the memory cells are desired. At the location where the light beam is focused, a pit is formed. The forming of the pit by the light beam exposes the plastic below the masking material. The plastic plate with pits formed this way is shown in FIGS. 4 and 5. This completes the first step.

The base plate prepared in the first step is then coated with the ablative material of the memory device. Again, there are several ways to coat the ablative material. These include vapor depositing in vacuum, sputtering, and vaporization of a solution of the ablative material. FIG. 6 shows the base plate with the ablative material applied. The masking material is then removed by dissolving it with a solvent or dissolving it chemically. The removal of the masking material leaves the plastic plate with pits that have ablative material in them. This completes the second step. FIG. 7 shows the base plate prepared this way.

Another plastic plate is prepared. The second plastic plate is joined with the first plastic plate. The two may be joined by fusion with heat or by adhesive. This completes the third step and thus the making of the memory device. The completed memory device is shown in FIG. 8.

EXAMPLE 7

A plastic plate is prepared with a flat surface. The plate is coated with a thin layer of masking material. The masking material is soluble in a stripping solution to be used later in the second step. The coated plastic plate is shown in FIGS. 2 and 3.

A high power light source preferably a laser, is focused on the surface of the plate to ablate the masking layer. The beam is focused, one after another, at the locations where the memory cells are desired. At the location where the light beam is focused, the plastic is uncovered. A perspective view of the base plate prepared this way is shown in FIG. 13 with the base plate 1, the masking layer 2, and the uncovered area 9.

A solvent that does not dissolve the masking layer is then used to partially dissolve the uncovered surface of the plastic plate thus prepared. This forms pits in the uncovered areas. The plastic plate with pits formed this way is shown in FIGS. 4 and 5. This completes the first step.

The base plate prepared in the first step is then coated with the ablative material of the memory device. Again, there are several ways to coat the ablative material. These include vapor depositing in vacuum, sputtering, and vaporization of a solution of the ablative material. FIG. 6 shows the base plate with the ablative material applied. The masking material is then removed by dissolving it with a solvent or dissolving it chemically. The removal of the masking material leaves the plastic plate with pits that have ablative material in them. This completes the second step. FIG. 7 shows the base plate prepared this way.

Another plastic plate is prepared. The second plastic plate is joined with the first plastic plate. The two may be joined by fusion with heat or by adhesive. This completes the third step and thus the making of the memory device. The completed memory device is shown in FIG. 8.

EXAMPLE 8

A glass plate is prepared with a flat surface. The plate is coated with a thin layer of masking material. The masking material is soluble in a stripping solution to be used later in the second step. The coated base plate is shown in FIGS. 2 and 3.

A high power light source, preferably a laser, is focused on the surface of the plate to ablate the masking layer. The beam is focused, one after another, at each location where the memory cells are desired. At the location where the light beam is focused, the glass is uncovered. A perspective view of the base plate prepared this way is shown in FIG. 13 with the base plate 1, the masking layer 2, and the uncovered area 9.

The glass plate thus prepared are then etched to form pits in the uncovered areas. The glass plate with pits formed this way is shown in FIGS. 4 and 5. This completes the first step.

The base plate prepared in the first step is then coated with the ablative material of the memory device. Again, there are several ways to coat the ablative material. These include vapor depositing in vacuum, sputtering, and vaporization of a solution of the ablative material. FIG. 6 shows the base plate with the ablative material applied. The masking material is then removed by dissolving it with a solvent or dissolving it chemically. The removal of the masking material leaves the base plate with pits that have ablative material in them. This completes the second step. FIG. 7 shows the base plate prepared this way.

Another glass plate is prepared. The second glass plate is joined with the first glass plate. The two may be joined by fusion with heat or by adhesive. This completes the third step and thus the making of the memory device. The completed memory device is shown in FIG. 8.

EXAMPLE 9

This example illustrates a variation in uniting the base plate and the cover plate.

A flat glass plate is coated with photo resist as the masking layer. FIGS. 2 and 3 show the base plate coated with the photo resist. Shown in the figures are the base plate 1 and the masking layer 2 (i.e. the photo resist). The coated plate is exposed to light through a photomask with suitable pattern on it. The exposed photo resist is then developed so that certain areas of the coated layer are removed. The area with the photo resist removed is the location where the memory cell will be located in the final product. A perspective view of the base plate prepared this way is shown in FIG. 13 with the base plate 1, the masking layer 2, and the uncovered area 9.

The glass plate thus prepared are then etched to form pits at the uncovered areas. The base plate with pits formed this way is shown in FIGS. 4 and 5. This completes the first step.

The base plate prepared in the first step is then coated with the ablative material. Again, there are several ways to coat the ablative material. These include vapor depositing in vacuum, sputtering, and evaporization of a solution of the ablative material. FIG. 6 shows the base plate with the ablative material applied. The photo resist is then removed by dissolving it with a solvent or dissolving it chemically. The removal of the photo resist leaves the base plate with pits that have ablative material in them. This completes the second step. FIG. 7 shows the base plate prepared this way.

Figure 14:
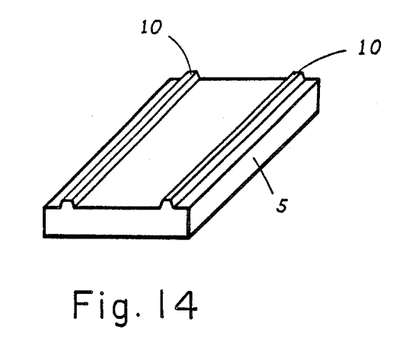
FIG. 14 shows a cover plate with spacers.

A second glass plate is then prepared with a flat surface and a number of mesas to cover the first glass plate. The mesa is a raised island which serves as a spacer between the base plate and the cover plate when the two are joined. FIG. 14 shows the cover plate 5 with the spacers 10. The cover plate is then coated with a layer of binding agent.

The two pieces of glass are joined together with application of heat. The function of the spacer is to control the spacing between the base plate and the cover plate. This provides space for the binding agent so that it does not flow to other places when heat and pressure are applied between the two plates.

Figure 15:
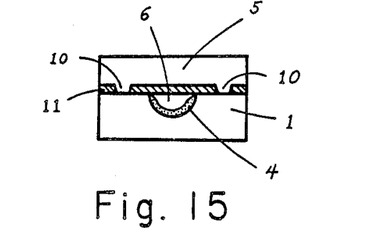
FIG. 15 shows a completed device with the base plate and the cover plate joined.

The joining of the two pieces of glass completes the third step and thus the making of the memory device. FIG. 15 shows the completed memory device with the base plate 1, the cover plate 5, the spacer 10, the binding agent 11, the ablative material 4, and the empty cell 6.

EXAMPLE 10

This example illustrates a variation in the application of the binding agent for uniting the base plate and the cover plate.

A flat glass plate is coated with a binding agent for uniting glass, such as the glass solder or silica described in Example 3. The plate is then coated with a layer of photo resist as the masking layer on top of the binding agent. The coated plate is exposed to light through a photomask with suitable pattern on it. The exposed photo resist is then developed so that certain areas of the coated layer are removed. The area with the photo resist removed is the location where the memory cell will be located in the final product.

Figure 16:
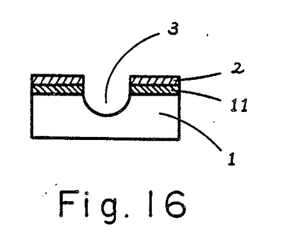
FIG. 16 shows a pitted base plate with binding agent and a masking layer.

The glass plate thus prepared are then etched to form pits in the uncovered areas. Both the binding agent and the glass of the base plate are etched. The glass plate with pits formed this way is shown in FIG. 16. Shown in the figure are the base plate 1, the binding angent 11, the photo resist 2, and the pit 3. This completes the first step.

Figure 17:
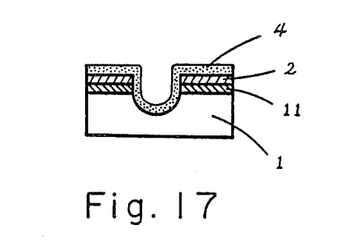
FIG. 17 shows the base plate with ablative material applied.
Figure 18:
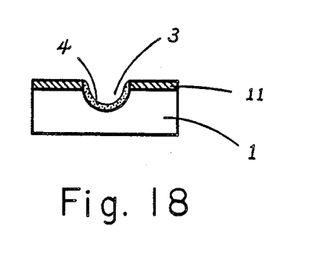
FIG. 18 shows the base plate with the masking layer removed.

The base plate prepared in the first step is then coated with the ablative material. Again, there are several ways to coat the ablative material. These include vapor depositing in vacuum, sputtering, and evaporization of a solution of the ablative material. FIG. 17 shows the base plate 1, the binding agent 11, the photo resist 2, and the ablative material 4. The photo resist is then removed by dissolving it with a solvent or dissolving it chemically. The removal of the photo resist leaves the base plate with pits that have ablative material in them. The binding agent remains on the surface of the base plate. This completes the second step. FIG. 18 shows the base plate 1, the binding agent 11, the ablative material 4, and the pit 3.

A second glass plate is then prepared with a flat surface to cover the first glass plate. The two pieces of glass are joined together by heat to form the memory device.

Figure 19:
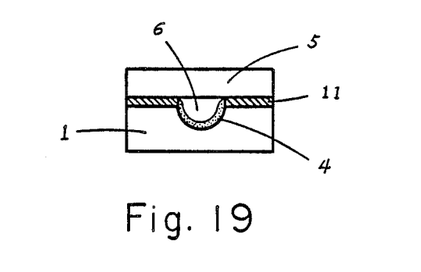
FIG. 19 shows the completed device with the base plate and the cover plate joined.

The joining of the two plates completes the third step and thus the making of the memory device. The completed memory device is shown in FIG. 19 with the base plate 1, the cover plate 5, the binding agent 11, the ablative material 4, and the empty cell 6.

I claim:

1. The method of making an optical memory device comprising a light-transparent substrate having a plurality of void cells and a preselected amount of ablative material in each void cell only partly filling each cell such that the ablative material can be redeposited at a plurality of locations in each cell, said method comprising the steps of applying a masking layer of coating on the surface of a base plate; mechancially stamping the coated base plate surface with a punch to cause the punch to penetrate and displace the masking layer to partially uncover the base plate at preselected areas; etching the uncovered portions of the base plate to form pits at preselected areas in the base plate; depositing ablative material as a coating on the surface of the masking layer and on the base plate in the pits such that said ablative material fills only a portion of the volume of each of said pits; removing the masking layer and ablative layer outside of the pits by dissolving the masking coating and carrying with it the overlaying ablative material; and then laminating the base plate with a cover plate to form void memory cells at the pitted areas with the ablative material sealed in the void cells to thereby form said optical memory device wherein the cover plate and base plate together function as said substrate, wherein said ablative material is opaque to radiant energy and is vaporizable in response to a high intensity radiant energy beam, and the amount of ablative material supplied to each pit is limited such that the ablative material can be redeposited at a plurality of locations in said cells.

2. The method of making an optical memory device comprising a light-transparent substrate having a plurality of void cells and a preselected amount of ablative material in each void cell only partly filling each cell such that the ablative material can be redeposited at a plurality of locations in each cell, said method comprising the steps of applying a masking layer of coating on the surface of a base plate; mechanically stamping the coated base plate surface with a punch to cause the punch to penetrate and displace the making layer to partially uncover the base plate at preselected areas; dissolving the uncovered portions of the base plate to form pits at preselected areas in the base plate; depositing ablative material as a coating on the surface of the masking layer and on the base plate in the pits such that said ablative material fills only a portion of the volume of each of said pits; removing the masking layer and ablative layer outside of the pits by dissolving the masking coating and carrying with it the overlaying ablative materials; and then laminating the base plate with a cover plate to form void memory cells at the pitted areas with the ablative material sealed in the void cells to thereby form said optical memory device wherein the cover plate and base plate together function as said substrate, wherein said ablative material is opaque to radiant energy and is vaporizable in response to a high intensity radiant energy beam, and the amount of ablative material supplied to each pit is limited such that the ablative material can be redeposited at a plurality of locations in said cells.

* * * * *

UNITED STATES PATENT AND TRADEMARK OFFICE
CERTIFICATE OF CORRECTION

PATENT NO. : 4,781,790

DATED : November 1, 1988

INVENTOR(S) : Jiun-Tsong Wu

It is certified that error appears in the above-identified patent and that said Letters Patent is hereby corrected as shown below:

Column 2, line 18, "detail" should be -- detailed --.
          line 43, "details" should be -- detail --.
          line 44, "ways" should be -- way --.
          line 52, "purpose" should be -- purposes --.
          line 65, "details" should be -- detail --.
Column 3, line 43, "ways" should be -- way --.
          line 49, "preferable" should be -- preferably --.
          line 50, "solvable" should be -- soluble --.
Column 4, line 23, "adhession" should be -- adhesion --.
          line 43, "adhessive" should be -- adhesive --.
          line 58, "preferable" should be -- preferably --.
          line 59, "solvable" should be -- soluble --.
          line 67, "purpose" should be -- purposes --.
Column 5, line 36, "adhessive" should be -- adhesive --.
          line 45, "preferable" should be -- preferably --.
          line 46, "solvable" should be -- soluble --.
          line 54, "purpose" should be -- purposes --.
Column 6, line 3, "are" should be -- is --.
          line 5, "amonium" should be -- ammonium --.
          line 6, "amonium" should be -- ammonium --.
          line 26, "adhessive" should be -- adhesive --.
          line 34, after "such", add -- as --.
          line 44, "infarad" should be -- infrared --.
Column 7, line 3, "are" should be -- is --.
          line 7, "ste" should be -- step --.
          line 58, "adhessive" should be -- adhesive --.
Column 9, line 16, "are" should be -- is --.
          line 56, "are" should be -- is --.
Column 10, line 36, "are" should be -- is --.
           line 40, "angent" should be -- agent --.
Column 3, line 15, "plated" should be -- plate --.

UNITED STATES PATENT AND TRADEMARK OFFICE
CERTIFICATE OF CORRECTION

PATENT NO. : 4,781,790

DATED : November 1, 1988

INVENTOR(S) : Jiun-Tsong Wu

It is certified that error appears in the above-identified patent and that said Letters Patent is hereby corrected as shown below:

Column 6, line 34, after "fluoride", add -- , -- .

Signed and Sealed this

Fifteenth Day of August, 1989

Attest:

DONALD J. QUIGG

Attesting Officer

Commissioner of Patents and Trademarks